US006870925B2

(12) United States Patent
Culp

(10) Patent No.: US 6,870,925 B2
(45) Date of Patent: Mar. 22, 2005

(54) METHOD AND APPARATUS FOR PROVIDING MUSIC TO AN AGENT DURING NON-VOICE DIALOG COMMUNICATION IN AN AUTOMATIC CALL DISTRIBUTOR SYSTEM

(75) Inventor: Christopher Gordon Culp, Wheaton, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 707 days.

(21) Appl. No.: 10/008,175

(22) Filed: Nov. 13, 2001

(65) Prior Publication Data

US 2003/0091178 A1 May 15, 2003

(51) Int. Cl.$^7$ .......................... G06F 15/16; H04L 12/66; H04M 3/493; H04M 3/523
(52) U.S. Cl. ............. 379/265.02; 370/352; 379/101.01; 379/265.09; 709/227
(58) Field of Search ................................. 370/352, 353, 370/354, 389; 379/101.01, 265.01, 265.02, 265.03, 265.04, 265.05, 265.09; 709/204, 206, 227

(56) References Cited

U.S. PATENT DOCUMENTS

| | | | | |
|---|---|---|---|---|
| 5,127,004 A | | 6/1992 | Lenihan et al. | 370/525 |
| 5,140,611 A | | 8/1992 | Jones et al. | 375/219 |
| 5,268,903 A | | 12/1993 | Jones et al. | 370/384 |
| 5,535,270 A | * | 7/1996 | Doremus et al. | 379/266.01 |
| 5,721,770 A | * | 2/1998 | Kohler | 379/265.12 |
| 5,884,032 A | * | 3/1999 | Bateman et al. | 709/204 |
| 5,894,512 A | * | 4/1999 | Zenner | 379/265.02 |
| 6,091,812 A | * | 7/2000 | Iglehart et al. | 379/308 |
| 6,192,050 B1 | * | 2/2001 | Stovall | 370/389 |
| 6,314,089 B1 | * | 11/2001 | Szlam et al. | 370/270 |
| 6,771,766 B1 | * | 8/2004 | Shafiee et al. | 379/265.09 |
| 6,819,755 B2 | * | 11/2004 | Stumer et al. | 379/265.02 |
| 6,819,756 B2 | * | 11/2004 | Stumer et al. | 379/265.02 |

* cited by examiner

*Primary Examiner*—Harry S. Hong
(74) *Attorney, Agent, or Firm*—Welsh & Katz, Ltd.

(57) ABSTRACT

A method and apparatus for directing music to agents of an automatic call distributor (ACD) during non-voice dialog communication between the agent and a caller includes a communication processor operatively coupled to the ACD and operatively coupled to the agent terminals. The communication processor is configured to facilitate sending and receiving non-voice dialog communication between the caller and the agent terminal, and to transmit a signal to the ACD indicating that the communication processor received the non-voice dialog communication from the caller. The ACD is configured to select an agent to receive the non-voice dialog communication from the communication processor, and cause the non-voice dialog communication to be routed to the selected agent. A music source is operatively coupled to the ACD such that music from the music source is directed to the selected agent during the non-voice dialog communication between the caller and the agent.

59 Claims, 2 Drawing Sheets

METHOD AND APPARATUS FOR PROVIDING MUSIC TO AN AGENT DURING NON-VOICE DIALOG COMMUNICATION IN AN AUTOMATIC CALL DISTRIBUTOR SYSTEM

FIELD OF THE INVENTION

The present invention relates generally to an automatic call distributor system (ACD), and more specifically to a method and apparatus for providing music to an agent of the ACD during non-voice dialog communication.

BACKGROUND

Systems which automatically distribute customer contacts or calls (generically "ACD") are often employed in telemarketing environments in which agents stationed at agent telephone sets answer many different types of telephone calls and other types of customer contacts (VoIP, emails, facsimile, chat room dialog, instant messaging, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. In these known systems, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, alternative ACD's may be used exclusively by or on behalf of a single vendor such that all of the contacts processed by the agent involve one particular vendor.

Often, a customer call is distributed to an agent that involves interactive voice dialog. This means a normal two-way verbal exchange. In this situation, the agent's attention should be focused on the customer dialog, and external distractions, such as extraneous noise and sounds should be minimized. When agents are idle, an ACD, because it handles two-way audio communication, may route music to the agent via an ACD's voice channel. This may increase agent productivity and may have a calming effect on the agent. This involves routing the music source over the same pathway or voice channel that is normally established between the agent and the caller, except that when the agent is idle, there is no caller. Of course, when the agent becomes busy, that is, is in verbal communication with a caller, the ACD terminates the music to the agent.

An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. Handling of the non-voice dialog contact may require a specialized device or subcomponent of the ACD. In this situation, the agent will typically view text on a display screen that the caller typed in or transmitted. In response, the agent may provide information to the contact or request information from the caller, via the keyboard or other input device. Essentially, the dialog between the agent and the caller occurs on a computer display screen. Further, the agent may handle multiple calls. For example, the agent may handle four to five simultaneous non-voice dialog communications, which are typically viewed as four or five separate dialog windows on the display screen, which may be tiled or layered.

In the above-described situation, the agent does not speak with the contact, but rather, the agent types his or her responses using the keyboard or other input device. This tends to be a solitary task in which the agent is prone to becoming bored. This may have a negative impact on the agent's productivity and efficiency. Accordingly, it is desirable to provide the agent with music while handling the non-verbal dialog communication. Known ACD's, however, only provide music to an agent who is idle, that is, when the agent is not engaged in any communication with a customer or potential customer. The ACD provides such music via the voice channel from the ACD to the agent. No provision currently exists to route music to the agent during non-voice dialog communication, such as when the agent is handling a non-voice dialog communication, because during non-voice dialog communication, no voice channel is active or connected between the ACD and the agent.

SUMMARY

One embodiment of the present invention for directing music to agents of an automatic call distributor (ACD) during non-voice dialog communication between the agent and a caller includes a communication processor operatively coupled to the ACD and operatively coupled to the agent terminals. The communication processor is configured to facilitate transmitting and receiving non-voice dialog communication between the caller and the agent terminal, and to transmit a signal to the ACD indicating that the communication processor received the non-voice dialog communication from the caller. The signal permits the ACD to track and manage the non-voice dialog communication. The ACD is configured to select an agent to receive the non-voice dialog communication from the communication processor, and cause the non-voice dialog communication to be routed to the selected agent. A music source is operatively coupled to the ACD such that music from the music source may be directed to the selected agent during the non-voice dialog communication between the caller and the agent.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
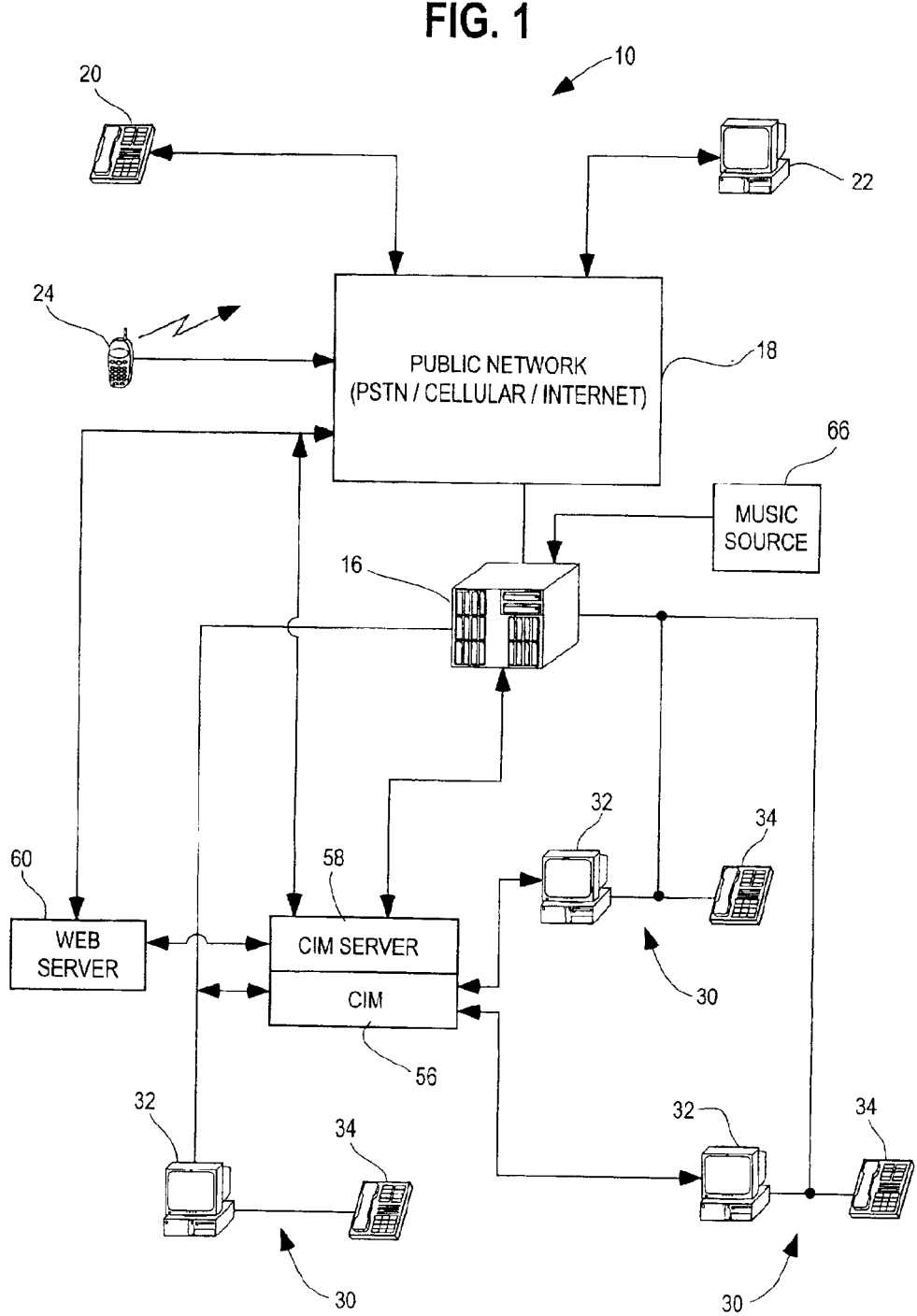
FIG. 1 is a pictorial view of a specific embodiment of an apparatus for providing music to an agent of an exemplary ACD.

Referring now to FIG. 1, an exemplary embodiment of an apparatus 10 for providing music to an agent of an automatic call or contact distributor system (ACD) 16 during non-voice dialog communication is shown generally. The present invention may be implemented in numerous types and sizes of systems for distributing calls to selected ones of a plurality of agents. One example of an ACD system that may be used in the present invention is the SPECTRUM ACD product, available from Rockwell Electronic Commerce of Illinois. Other types of call distribution systems including, for example, distribution systems or those using one or more personal computers or servers may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," and U.S. Pat. No. 5,127,004, issued to Lenihan et al. on Jun. 30, 1992, entitled "Tone and Announcement Message Code Generator for a Telephonic Switching System and Method," the disclosures of which are hereby incorporated by reference in their entirety.

A customer or caller may be connected to the ACD 16 through a public switched telephone network (PSTN) 18, which caller may connect to the PSTN through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent may have initiated the call to the contact. Accordingly, the term "caller" shall broadly refer to the contact or potential customer even though the agent may have originated or initiated the call or contact.

In the illustrated embodiment, multiple agent stations or terminals 30 are shown coupled to the ACD 16. For purposes of illustration, only three agent stations are shown, but any suitable number of agents may be coupled to the ACD 16. The agent stations 30 may also include agent station computers 32 or terminals, and/or telephone sets 34.

Figure 2:
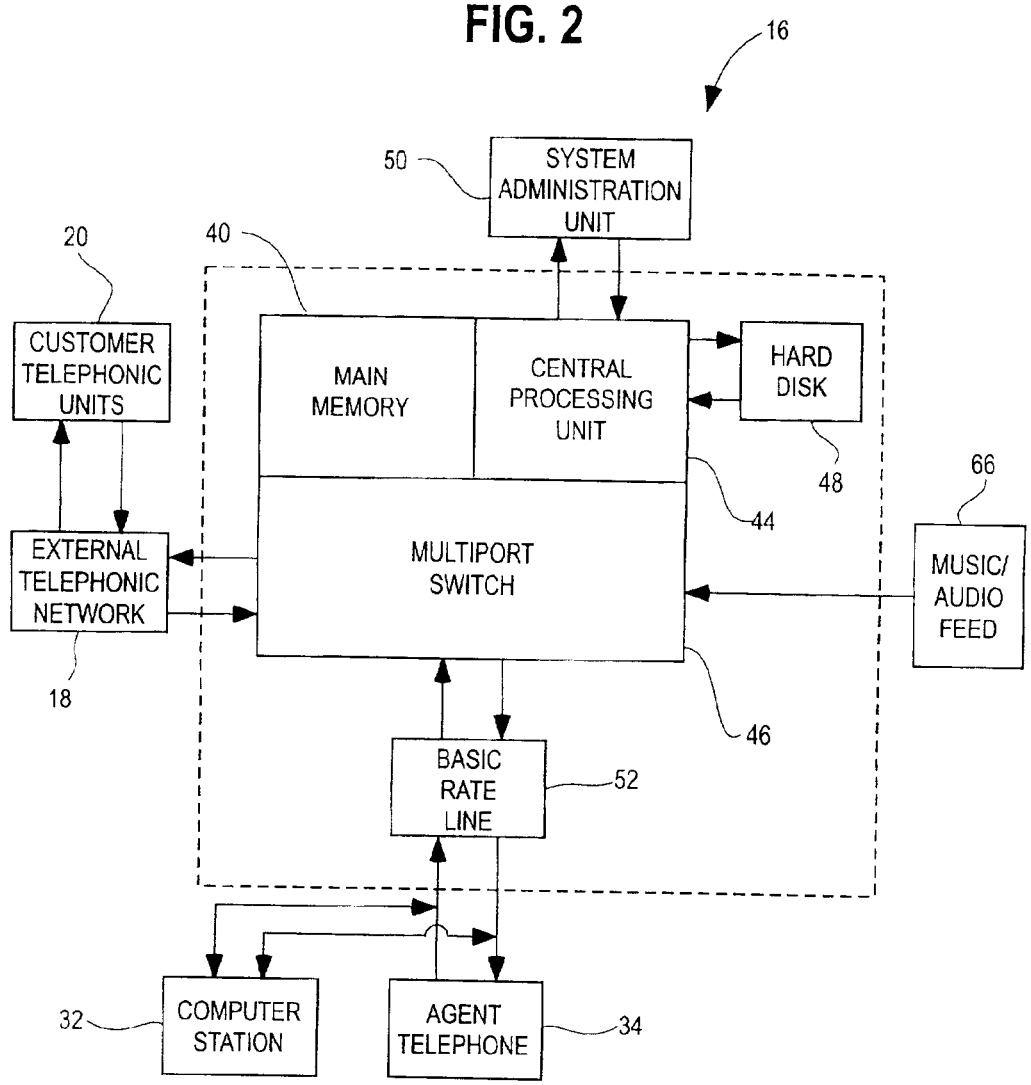
FIG. 2 is a block diagram of a specific embodiment of an ACD operatively coupled to a music source.

Referring now to FIGS. 1 and 2, FIG. 2 shows an example of an ACD 16 in greater detail. The ACD 16 may comprise hardware and/or software and, for example, may include a main memory 40, a central processing unit 44 and a multi-port switch 46, each of which may be separate units, distributed components, or integrated at a single location or single cabinet. The multiport switch 46 is coupled to the PSTN 18, which in turn, is connected to customer telephones 20, or other communication devices (20, 22, or 24). The central processing unit 44 may include storage, such as hard disk storage 48, and may also be coupled to a system administration unit 50. The ACD 16 is connected through a suitable communication link to the plurality of agent telephonic sets 34, for example, through a basic rate line 52, as is known in the art. The agent computer station 32 and the agent telephone sets 34 may be incorporated into a single unit, as is known in the art.

The illustrated ACD 16 may handle voice communication and may also handle non-voice communication, such as emails, facsimile, chat room dialog, instant messaging, Internet, etc. Non-voice dialog communication is another form of contact communication, and the ACD 16, when properly configured and coupled to appropriate hardware and/or software devices, is not limited to processing voice based telephone calls, as described above. The ACD 16 may be a single integrated device, or may included distributed hardware and software. In one specific embodiment, the SPECTRUM ACD product available from Rockwell Electronic Commerce, Inc. may include a non-voice dialog communication processor, such as, for example, a Contact Integration Manager (CIM) 56, which may be a CIM Release No. 1.1, also available from Rockwell Electronic Commerce, Inc. In the specific embodiment shown, the communication processor 56 or CIM (also referred to as non-voice dialog communication processor) may handle the non-voice dialog communication between the customer or caller, and the agent.

The communication processor 56 may be operatively coupled to the ACD 16 and to the agent computer 32 or agent stations 30. Typically, the communication processor 56 receives email, chat room dialog, facsimile, instant message, Internet communication and the like from a communication processor server 58. The communication processor server 58, in turn, may receive additional non-voice dialog contact communication request from a web server 60, which may be connected to the PSTN 18. In one specific embodiment, the communication processor 58 may be separate from the ACD and operatively coupled to the ACD 16. Alternatively, the communication processor 56 may be integrated into a portion of the ACD 16. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

In one specific embodiment of the apparatus 10, music may be provided to the agents of the ACD 16 during non-voice dialog communication between the agent and the caller. Note that in known ACD systems, neither music nor interactive voice communication can be provided to the agents during non-voice dialog communication because known ACD's are configured to handle interactive voice dialog communication between the caller and the agent through an active or connected voice channel. Accordingly, such music would be routed through the ACD's active or connected voice channel with the agent. With non-voice dialog communication, however, the ACD's voice channel is not utilized for communications, meaning it is not connected to the agent. Rather, the communication processor 56 handles the non-voice dialog communication, which bypasses the ACD's voice channel. The non-voice dialog communication handled by the communication processor 56 is essentially "invisible" to the ACD 16, although a mechanism exists for the ACD 16 to track and manage the non-voice dialog communication, as described below.

Note that in another alternate embodiment, information other than music may be provided to the agent during non-voice dialog communication, such as public address announcements, public safety and emergency announcements, and corporate and vendor announcements. Such information may be directed to one or more of the agents simultaneously.

In an alternate embodiment, the music source may be operatively coupled to the communication processor rather than to the ACD 16. In that embodiment, the communication processor 56 may direct the music to the agent during the non-voice dialog communication.

The communication processor 56 is configured to facilitate sending and receiving non-voice dialog communication between the caller and the agent or agent terminal 30, and to transmit a signal to the ACD 16 indicating that the communication processor received the non-voice dialog communication from the caller. The signal from the communication processor 56 to the ACD 16 creates a "call appearance" so that the ACD is brought into the communication "loop," and is able to track and manage the contact. The call appearance simulates to the ACD 16 the appearance of a voice-type call, even though a voice-type call is not present. Once the call appearance to the ACD 16 has been made, the ACD can queue and manage the non-voice dialog communication to the appropriate agent as if the call were an ordinary interactive voice-dialog call, even though the ACD may not utilize or connect its voice channel to the agent. Rather, the communication processor 56 handles the non-voice dialog communication and provides the communication to the agent, and also informs the ACD 16 regarding the status and initiation of the contact.

Accordingly, once the call appearance has been made, the ACD 16 in the illustrated embodiment of FIG. 1 selects a particular agent to receive the non-voice dialog communication from the communication processor 56, and then causes the non-voice dialog communication to be routed to the selected agent by the communication processor. Selection of the agent is performed according to any suitable method including known methods, such as the agent's availability, time past since prior contact, number of calls previously processed by the agent, efficiency rating of the agent, and the like.

Once the non-voice dialog communication has been routed to the agent, the agent handles the non-voice dialog call or contact, but of course, does not speak to the caller. Accordingly, in one embodiment as illustrated in FIG. 1, music may be directed to the agent during this time by the ACD 16. The ACD 16 is operatively coupled to a music source 66, which may be, for example, recorded music, or may be a music "feed" from a third party music provider. The ACD 16 essentially activates or connects the voice channel from the ACD 16 to the agent. However, utilization or connection of the voice channel in this capacity is unidirectional. That is, the ACD 16 only provides a one-way path such that music from the music source 66 is provided to the agent via the ACD's voice channel, but the agent is not able to utilize the ACD's voice channel to transmit voice data. It would be meaningless to consider voice data sent by the agent through the ACD's voice channel in this situation because the ACD 16 has not connected the agent to a caller. Rather, as described above, the communication processor 56, not the ACD 16, may handle the communication pathway between the caller and the agent for non-verbal dialog communications. In another embodiment, the music source may be coupled to, or otherwise be integrated with, another component of the system and control the coupling of the music to the agent. It may be located at or distributed among other components of the system. For example, music sources may be coupled to or located in the agent personal computers 32 and may be partially or entirely controlled by the agent personal computer.

During the silent periods when the agent is handling non-voice dialog communication, the music provided to the agent may aid in calming and relaxing the agent, and also may aid in relieving any boredom that may be induced. This increases agent productivity and job satisfaction. Of course, when the non-voice dialog communication is terminated, the music provided to the agent may be similarly terminated. Additionally, a supervisor may configure the ACD 16 or software residing in the ACD to "disable" routing music to one more agents, depending upon agent preferences. For example, some agents may not enjoy music.

As described above, the non-voice dialog communication may be in the form of email, chat-room sessions, instant messages (such as the type provided by AOL or other Internet service providers), facsimile and text messages. Generally such non-voice dialog communication is text-based and graphics-based communication. However, such communication may also include video and/or audio clips, as such media is often transmitted or attached via email and chat room sessions. Such video and audio clips are still deemed to be non-voice dialog communication even if they contain some voice data, because the voice data is not interactive, that is, it is not a dialog where the voice data is communicated by the caller to the agent, and the agent responds in kind. Such unidirectional communication that does not permit interactive voice communication between the caller and the agent is considered to be non-voice dialog communication, as set forth herein. Accordingly, the communication processor 56 may also be referred to as a graphics processor because it generally handles text and graphics, even though video and audio clips are not strictly deemed to be graphic data.

Specific embodiments of the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A system for directing music to agents corresponding to agent terminals of an automatic call distribution system during non-voice dialog communication between the agent and a caller, the automatic call distribution system configured to handle interactive voice dialog communication between the caller and the agent, the system comprising:

a communication processor operatively incorporated into the automatic call distribution system and configured to facilitate sending and receiving non-voice dialog communication between the caller and the agent terminal, and to generate a signal indicating that the communication processor received the non-voice dialog communication request from the caller, the signal permitting the automatic call distribution system to track the non-voice dialog communication;

a music source operatively coupled to the automatic call distribution system;

the automatic call distribution system configured to select one or more agents to receive the non-voice dialog communication from the communication processor, and cause the non-voice dialog communication to be routed to the selected agents, such that music from the music source is directed to the selected agent during the non-voice dialog communication between the caller and the agent.

2. The system of claim 1 wherein the communication processor is a separate processor operatively coupled to the automatic call distribution system.

3. The system of claim 1 wherein the communication processor is integrated into the automatic call distribution system.

4. The system of claim 1 wherein the communication processor is part of an agent terminal.

5. The system of claim 1 wherein the communication processor is a personal computer.

6. The system of claim 1 wherein the communication processor is selected from the group consisting of a computer, microprocessor, RISC processor, mainframe computer, work station, single-chip computer, distributed processor, server, controller, micro-controller, discrete logic computer, remote computer, personal computer, internet computer, and web computer.

7. The system of claim 1 wherein the non-voice dialog communication is selected from the group consisting of email, chat-room sessions, instant messages, facsimile and text messages.

8. The system of claim 1 wherein the non-voice dialog communication is text-based and graphics-based communication.

9. The system of claim 1 wherein the non-voice dialog communication includes at least one of a video clip communication and an audio clip communication.

10. The system of claim 9 wherein at least one of the video clip communication and the audio clip communication includes voice data.

11. The system of claim 10 wherein the voice data represents unidirectional communication that does not permit interactive voice communication between the caller and the agent.

12. The system of claim 1 wherein the automatic call distribution system directs the music from the music source to the agent during the non-voice dialog communication.

13. The system of claim 1 wherein the communication processor directs the music from the music source to the agent during the non-voice dialog communication.

14. The system of claim 1 wherein the music is not directed to the agent during interactive voice dialog communication between the caller and the agent.

15. The system of claim 1 wherein the music is routed to the agent during the non-voice dialog communication between the caller and the agent, and no music is routed to the agent during the interactive voice dialog communication between the caller and the agent.

16. The system of claim 1 wherein the directing of the music to the agent during the non-voice dialog communication between the caller and the agent increases agent productivity.

17. The system of claim 1 wherein the music source is coupled to the agent terminal.

18. A system for directing audio information to agents corresponding to agent terminals of an automatic call distribution system during non-voice dialog communication between the agent and a caller, the automatic call distribution system configured to handle interactive voice dialog communication between the caller and the agent, the system comprising:

a communication processor operatively incorporated into the automatic call distribution system and configured to receive non-voice dialog communication from the caller, and to generate a signal indicating that the communication processor received the non-voice dialog communication, the signal permitting the automatic call distribution system to track the non-voice dialog communication;

an audio information source operatively coupled to the automatic call distribution system;

the automatic call distribution system configured to select one or more agents to receive the non-voice dialog communication from the communication processor, and cause the non-voice dialog communication to be routed to the selected agents, such that the audio information is directed to the selected agent during the non-voice dialog communication.

19. The system of claim 18 wherein the communication processor is a separate processor operatively coupled to the automatic call distribution system.

20. The system of claim 18 wherein the communication processor is integrated into the automatic call distribution system.

21. The system of claim 18 wherein the communication processor is part of an agent terminal.

22. The system of claim 18 wherein the communication processor is a personal computer.

23. The system of claim 18 wherein the communication processor is selected from the group consisting of a computer, microprocessor, RISC processor, mainframe computer, work station, single-chip computer, distributed processor, server, controller, micro-controller, discrete logic computer, remote computer, personal computer, internet computer, and web computer.

24. The system of claim 18 wherein the non-voice dialog communication is selected from the group consisting of email, chat-room sessions, instant messages, facsimile and text messages.

25. The system of claim 18 wherein the non-voice dialog communication is text-based and graphics-based communication.

26. The system of claim 18 wherein the non-voice dialog communication includes at least one of a video clip communication and an audio clip communication.

27. The system of claim 26 wherein at least one of the video clip communication and the audio clip communication includes voice data.

28. The system of claim 27 wherein the voice data represents unidirectional communication that does not permit interactive voice communication between the caller and the agent.

29. The system of claim 18 wherein the ACD directs the music from the music source to the agent during the non-voice dialog communication.

30. The system of claim 18 wherein the communication processor directs the music from the music source to the agent during the non-voice dialog communication.

31. The system of claim 18 wherein the audio information source is coupled to the agent terminal.

32. The system of claim 18 wherein the audio information is music.

33. The system of claim 18 wherein the audio information is a public address announcement.

34. The system of claim 18 wherein the audio information is public safety and emergency information.

35. The system of claim 18 wherein the audio information is directed to a plurality of agents simultaneously.

36. The system of claim 18 wherein the audio information is not directed to the agent during interactive voice dialog communication between the caller and the agent.

37. The system of claim 18 wherein the audio information is routed to the agent during the non-voice dialog communication between the caller and the agent, and no audio information is routed to the agent during the interactive voice dialog communication between the caller and the agent.

38. A system for directing music to agents corresponding to agent terminals of an automatic call distribution system during non-voice dialog communication between the agent and a caller, the automatic call distribution system configured to handle interactive voice dialog communication between the caller and the agent, the system comprising:

a graphics processing means operatively incorporated into the automatic call distribution system and configured to facilitate sending and receiving non-voice dialog communication between the caller and the agent terminal, and to generate a signal indicating that the graphics processing means received the non-voice dialog communication from the caller, the signal permitting the automatic call distribution system to track the non-voice dialog communication;

a music source operatively coupled to the automatic call distribution system;

the automatic call distribution system configured to select one or more agents to receive the non-voice dialog communication from the graphics processing means, and cause the non-voice dialog communication to be routed to the selected agents, such that music from the music source is directed to the selected agent during the non-voice dialog communication between the caller and the agent.

39. The system of claim 38 wherein the graphic processing means is a separate processor operatively coupled to the automatic call distribution system.

40. The system of claim 38 wherein the graphic processing means is integrated into the automatic call distribution system.

41. The system of claim 38 wherein the graphic processing means is part of an agent terminal.

42. The system of claim 38 wherein the graphic processing means is a personal computer.

43. The system of claim 38 wherein the graphic processing means is selected from the group consisting of a computer, microprocessor, RISC processor, mainframe computer, work station, single-chip computer, distributed processor, server, controller, micro-controller, discrete logic computer, remote computer, personal computer, internet computer, and web computer.

44. The system of claim 38 wherein the non-voice dialog communication is selected from the group consisting of email, chat-room sessions, instant messages, facsimile and text messages.

45. The system of claim 38 wherein the non-voice dialog communication is text-based and graphics-based communication.

46. The system of claim 38 wherein the non-voice dialog communication includes at least one of a video clip communication and an audio clip communication.

47. The system of claim 46 wherein at least one of the video clip communication and the audio clip communication includes voice data.

48. The system of claim 47 wherein the voice data represents unidirectional communication that does not permit interactive voice communication between the caller and the agent.

49. The system of claim 38 wherein the automatic call distributor system directs the music from the music source to the agent during the non-voice dialog communication.

50. The system of claim 38 wherein the graphic processing means directs the music from the music source to the agent during the non-voice dialog communication.

51. The system of claim 38 wherein the music source is coupled to the agent terminal.

52. A method for directing music to agents corresponding to agent terminals of an automatic call distribution system during non-voice dialog communication between the agent and a caller, the method comprising the steps of:

configuring the automatic call distribution system to facilitate sending and receiving non-voice dialog communication and voice dialog communication between the caller and the agent terminal;

providing music to the automatic call distribution system;

selecting at least one agent of the automatic call distribution system to receive the non-voice dialog communication;

routing the non-voice dialog communication to the selected agent; and directing the music to the selected agent during the non-voice dialog communication between the caller and the agent.

53. The method of claim 52 wherein the non-voice dialog communication is selected from the group consisting of email, chat-room sessions, instant messages, facsimile and text messages.

54. The method of claim 52 wherein the non-voice dialog communication is text-based and graphics-based communication.

55. The method of claim 52 wherein the non-voice dialog communication includes at least one of a video clip communication and an audio clip communication.

56. The method of claim 55 wherein at least one of the video clip communication and the audio clip communication includes voice data.

57. The method of claim 56 wherein the voice data represents unidirectional communication that does not permit interactive voice communication between the caller and the agent.

58. The method of claim 52 wherein the automatic call distributor system directs the music to the agent during the non-voice dialog communication.

59. The method of claim 52 wherein the automatic call distributor system detects an end of the non-voice dialog communication and generates a music terminate signal.

* * * * *